(12) United States Patent
Mixon (10) Patent No.: US 6,353,306 B1
(45) Date of Patent: Mar. 5, 2002

(54) BATTERY CHARGER APPARATUS

(75) Inventor: Timothy S. Mixon, Hood River, OR (US)

(73) Assignee: Mixon, Inc., St. Paul, MN (US)

( * ) Notice: Subject to any disclaimer, the term of this patent is extended or adjusted under 35 U.S.C. 154(b) by 0 days.

(21) Appl. No.: 09/548,541

(22) Filed: Apr. 13, 2000

(51) Int. Cl.[7] ................................................. H02J 7/00
(52) U.S. Cl. ...................................... 320/160; 320/137
(58) Field of Search .............................. 320/160, 137, 320/134, 162

(56) References Cited

U.S. PATENT DOCUMENTS

| | | | |
|---|---|---|---|
| 5,402,007 A | * 3/1995 | Center et al. | 290/40 B |
| 5,602,459 A | * 2/1997 | Rogers | 320/160 |
| 5,623,197 A | 4/1997 | Roseman et al. | 320/134 |
| 5,703,476 A | 12/1997 | Merlo et al. | 323/313 |
| 5,773,964 A | 6/1998 | Peter | 322/20 |
| 5,929,613 A | 7/1999 | Tsuchiya et al. | 322/58 |

* cited by examiner

*Primary Examiner*—Peter S. Wong
*Assistant Examiner*—Lawrence Luk
(74) *Attorney, Agent, or Firm*—Haugen Law Firm PLLP

(57) ABSTRACT

A system for actively controlling the charging profile of a battery uses a software-based alternator control unit to control the charging voltage. The voltage applied to the battery is initially increased over normal values following battery discharge, to charge the battery back as fast as possible without damaging the battery or alternator. The voltage is then reduced to a normal charging level, and subsequently further reduced to a float level.

16 Claims, 11 Drawing Sheets

PERCENT VOLTAGE THRESHOLD VS NORMALIZED TEMPERATURE

Fig.-6

| Mode | Tier I Threshold (voltage) | Tier II Threshold (voltage) | Final Threshold (voltage) | Other Thresholds (voltage) | Tier I Multiplier (number) | Mandatory Stay at Tier I (time) | Stay at Tier II (time) | Stay at other Thresholds (time) |
|---|---|---|---|---|---|---|---|---|
| Decrease in minimum start voltage. | ↓ | ← | ← | ← | ← | ← | ← | ← |
| Increase in start time. | ← | ← | ← | ← | ← | ← | ← | ← |
| Increase in time to reach tier I threshold. | ← | ← | ← | ← | ← | ← | ← | ← |
| Decrease in ambient temperature. | ← | ↑ | ← | ← | X | X | X | X |
| Decrease in regular temperature. | ← | ← | ← | ↓ | X | X | X | X |
| Regulator at dangerously high temperature. | ↓↓↓ | ↓↓↓ | ↓↓↓ | ↓↓↓ | X | X | X | X |
| Charging system did not make it to tier I voltage last time. | ↓ | ← | ← | ← | ← | ← | ← | ← |
| Charging system did not complete tier I voltage last time. | ↑ | ↑ | ↑ | ↑ | ↑ | ↑ | ↑ | ↑ |
| Charging system spent an extended time at final threshold last time. | ← | ← | ← | ← | ← | ← | ← | ← |
| Short surface charge discharge time constant. | ← | ← | ← | ← | ← | ← | ← | ← |
| Battery's open circuit voltage decreased since engine off. | ← | ← | ← | ← | ← | ← | ← | ← |
| Vehicle has not run for an extended period. | ← | ← | ← | ← | ← | ← | ← | ← |

Fig.-7

BATTERY CHARGER APPARATUS

BACKGROUND OF THE INVENTION

The present invention relates to a "smart" voltage regulator for regulating the voltage of an alternator which, in turn, provides a charging current to a storage battery for improving battery performance by maintaining a proper level of charge, and by reducing sulfation on the surface of the plates.

By way of background, motor vehicles in the United States some years ago typically had six-volt systems comprising, in part, a battery, a direct current (DC) generator, a DC starting motor or starter which, when energized, would start an internal combustion engine which, in turn, would drive the DC generator. A voltage regulator connected to the DC generator would control the output DC voltage thereof.

More recently, most motor vehicles in the United States use twelve-volt systems comprising a twelve-volt battery (12 volt being a nominal output voltage thereof), an alternating current (AC) alternator with appropriate rectifying means for providing a DC current, a DC starter, and a voltage regulator for controlling the voltage output of the alternator. Twelve volt systems are described here as a reference. The present invention works equally well on any voltage system. The regulation set points are adjusted accordingly.

There are a number of uses or scenarios for the above described 12-volt system, all of which are based on the internal combustion engine and lead-acid battery combination. One use is with "over-the-road" trucks wherein the engines are operated more or less continuously for long periods of time, and thus, few start-up operations requiring battery current for starting are experienced. A large percentage of "passenger" vehicles make fairly frequent starts (one or more per day) with sufficient run time between each start so as to keep the battery charged. On the other hand, there are a number of applications such as recreational boats, recreational vehicles, antique and other cars wherein such vehicles are operated only occasionally, raising the likelihood of the storage battery used for starting the engine being significantly discharged throughout extended intervals during its life.

Another challenging application for a storage battery is in connection with vehicles that make long stops with loads left on, coupled with very little "run time". For example, delivery vehicles serving a high-density business section of a metropolitan area typically make long stops with "flashers" left on, coupled with very little run time between stops. The result is storage batteries that are consistently undercharged, shortening the life of the batteries.

The present invention actively monitors the needs of the above uses and changes the storage battery charging profile accordingly.

DISCUSSION OF THE PRIOR ART

There are, of course, numerous prior art voltage regulator systems for regulating the output voltage of the generator or alternator. Roseman, et al., U.S. Pat. No. 5,623,197 is an example of a prior art system which teaches the decreasing of the output voltage of the alternator when the battery is significantly discharged, to prevent excessive current from entering the battery. Roseman's application concentrates on nickel-cadmium and sealed lead-acid aviation batteries charged by an aviation electrical generator/starter. The present invention concentrates on lead-acid batteries with very different needs.

Current industry technology emphasizes the constant potential method. This method has its disadvantages. It is difficult to have one optimal voltage setting for all conditions. If the voltage setting is too high, overcharging occurs causing electrolysis (water use) and reduced battery life. If, however, the voltage is set too low, the battery remains undercharged for extended periods causing sulfation and reduced battery life.

U.S. Pat. No. 5,703,476 suggests that basing the voltage setting on double slope temperature compensation charges the battery better. Temperature, however, is only one factor in the battery's charging needs. Furthermore, battery temperature and regulator temperature are not often correlated. The physical placement of the battery is often different than the voltage regulator, resulting in poor temperature correlation.

The majority of voltage regulator prior art ignores the health of the battery, the primary role of the charging system. Tsuchiya, et al., U.S. Pat. No. 5,929,613 and Peter, et al., U.S. Pat. No. 5,773,964 are examples of this.

SUMMARY OF THE INVENTION

In broad terms, the present invention provides a voltage regulator which is capable of monitoring battery voltage, alternator voltage, voltage regulator temperature, battery temperature, and time. The regulator adjusts the charging profile based on the history of the foregoing five parameters. These parameters have varying importance depending upon the mode of the vehicle.

The primary purpose of the battery in vehicles is to start the engine. Discharged and failing batteries will have longer starts and lower minimum starting voltages. Therefore, it is wise to closely monitor and record voltage and time during starts. Minimum battery voltage during start, length of start, and the integral of delta voltage versus time may all be recorded by the present invention and used to adjust charging profile. After the engine is started, the present invention charges the battery back as fast as possible without, however, damaging the battery or alternator. The regulator sets its first threshold (Tier I) between 15 and 16 volts. It then records how long it takes to get to the Tier I threshold. This value (time) is used later to adjust the charging profile. Fully charged batteries take seconds to get to the Tier I threshold, while discharged batteries could take tens of minutes. The present invention lowers the system voltage before the risk of overcharging and damage occurs, thus achieving the goal of reaching Tier I threshold by charging the battery as rapidly as possible without overcharging. This feature also helps to break up sulfation on the battery's plates.

The present invention controller keeps the battery at the first threshold for a software determined length of time depending upon battery state of charge (from multiple seconds to minutes).

The smart regulator will then regulate the battery's voltage to a second threshold (Tier II). Tier II is in the voltage range of normal voltage regulators (14–15 volts). The regulator keeps the battery at Tier II for a period to ensure that the battery is fully charged, following which the controller tapers back the battery's voltage to a final threshold, or safe-float voltage. This increases fuel economy, battery life, alternator life, and halogen light life. The float voltage is in the range of 13.5 to 14.2 volts, which is the range similar to over-the-road trucks that spend the vast majority of their time running, and not starting.

Application of the present invention may include more than the described above thresholds (Tier I, Tier II, Tier III, etc.). Some of which may only be used when the controller deems it necessary based on the history of the system. Vehicles that have not run for an extended period are good examples of this. The controller may deem it necessary to add an extra high voltage phase (14.5 to 15.5 volts), in order to break up sulfation on the storage battery's plates and ensure the storage battery is fully charged. This change in charge profile increases the life of storage batteries for recreational boats, recreational vehicles, and other infrequently driven vehicles.

Batteries that have an abnormally low open circuit voltage are another example of where the controller may need to add an extra or extended high voltage phase (14.5 to 15.5 volts). Leaving headlights or electrical accessories on while the vehicle is not running induces this situation. Present vehicle charging systems are designed to keep storage batteries charged during normal use. They are not designed to fully recharge the storage battery. Often this results in storage batteries spending extended periods significantly discharged, resulting in storage battery plate sulfation and a reduction in battery life. The present invention dramatically changes the charging profile to minimize this problem.

It is advantageous for the present invention to communicate the information it collects about the charging system to the user and mechanic.

The present invention controls a light in the vehicle's dashboard or elsewhere. The light is flashed in two or more simple patterns. The first may indicate all charging parameters normal, the second pattern may direct the user to have the vehicle checked by a technician thus giving users feedback before serious problems occur.

The technician is equipped with a hand held data-receiving device. The present invention transfers all of the parameters it has recorded to the technician's hand held device. This is done through serial wire, optical sensor, infrared sensor, wireless signal or other means.

The hand held device has software to analyze the data and recommend the technician's next step. This tool will be invaluable for the technician's diagnostic, debug and preventative maintenance. Current charging system diagnostic tools only attempt to test the charging systems current state. The present invention gives the technician the ability take into account the history of the charging system.

DETAILED DESCRIPTION OF THE INVENTION

Figure 1A:
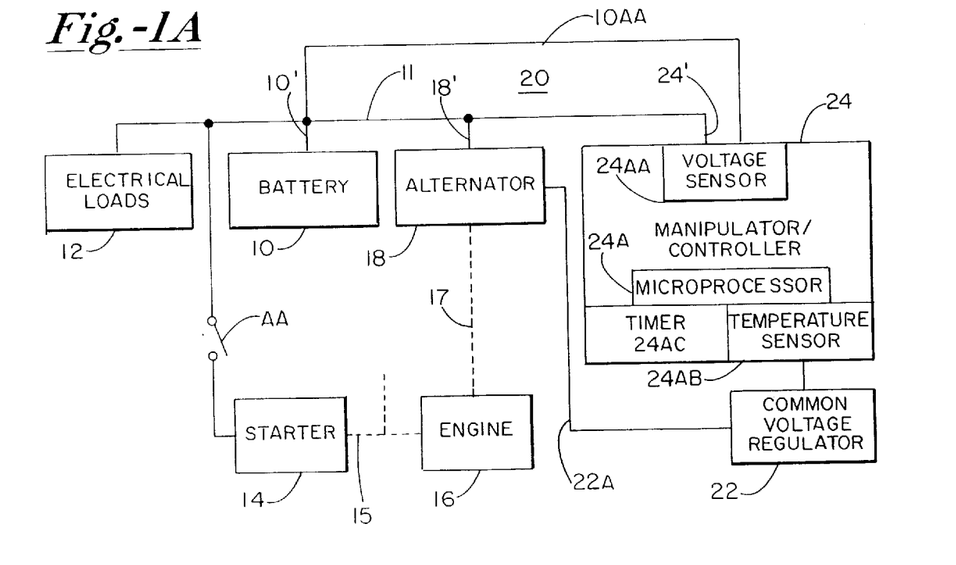
FIG. 1A is a block diagram of one embodiment of the present invention wherein the key technology is external of the voltage regulator module.
Figure 1B:
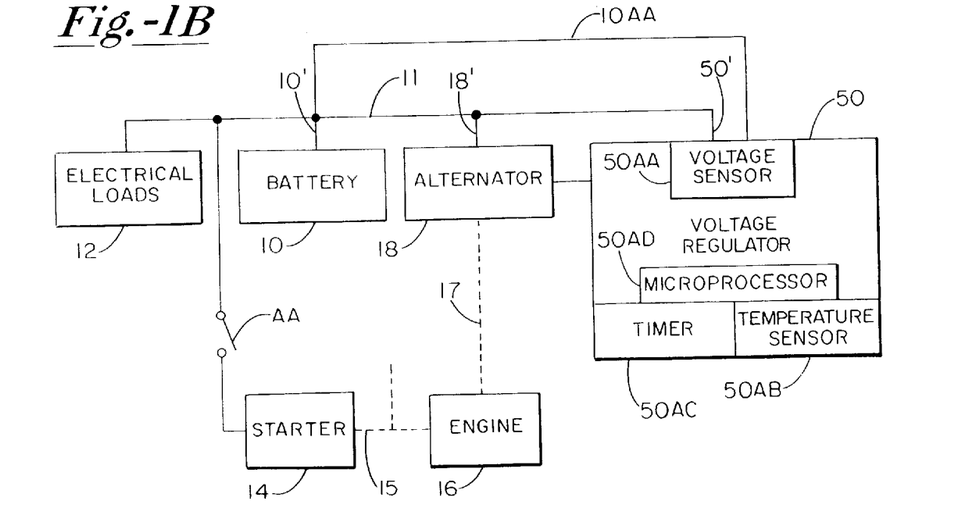
FIG. 1B is a block diagram of an alternative embodiment of the invention wherein the key technology is internal to the voltage regulator module.

Referring to FIG. 1A one embodiment of the present invention is shown in schematic block diagram form, and comprises a rechargeable battery 10, a plurality of electrical loads 12, a starter motor 14, an engine 16, and an alternator 18. The battery 10 is connected by 10' to a DC bus 11 to supply a plurality of electrical loads 12, as well as to selectively energize the starter motor 14 upon closing of the ignition switch AA. The starter motor is mechanically linked by 15 to the engine 16, the engine further, when operating, causing the rotation of the alternator 18 through the mechanical linkage 17. The invention further includes a voltage regulator 22 and a special manipulator or controller 24 provided by this invention. The voltage regulator 22 may be of any of the several commercially available voltage regulators in widespread use, or a voltage regulator incorporating the present invention's controller technology as disclosed in FIG. 1B. The controlling output for the alternator from the voltage regulator is applied via a connection 22AA to the alternator 18, to thus control the output voltage and current flow from the alternator to the bus 11 (via connection 18'), and thus to the battery 10, as well as the electrical loads 12. A connection 24' connects bus 11 with a voltage sensor 24AA of voltage controller 24 as a first input thereto; this input being indicative of the alternator voltage.

A second input to the controller 24 is battery voltage. This is provided by a connection 10AA between battery 10 and voltage sensor 24AA. It should be understood that, depending on several factors such as the current draw or the electrical loads 12 and the $I^2R$ losses in the current carrying lines or conductors, the battery and alternator voltages often are different and sometimes greatly different.

A third input to controller 24 is a control signal indicative of the temperature of the voltage regulator from an appropriate sensor 24AB. Finally, a timer 24AC connected by appropriate means provides yet another or fourth input to the controller 24.

Thus, in broad terms, the controller 24 of FIG. 1A is connected to receive and monitor battery voltage, alternator voltage, voltage regulator temperature, and time.

The temperature sensors 24AB may be any suitable sensors such as a thermistor or other sensor as are well known to those skilled in the art.

The controller 24 preferably includes a microprocessor 24AD having functions which are responsive to the example flowchart shown in FIGS. 4A–4F.

As described above, the controller 24 may be external of the standard voltage regulator 22. The controller works by sensing battery voltage and then sending signals to the voltage regulator sense input. This gives the invention control over the standard voltage regulator. However, in some instances, such as new equipment, it may be advantageous to have the controller internal, or integral, with the voltage regulator module; this is disclosed in FIG. 1B wherein similar elements are identified by the same reference numbers or letters. In this case, the smart regulator controls the alternator field current like standard regulators, but varies charge profile based on battery need. Thus, in FIG. 1B, the voltage regulator 50 comprises a voltage sensor 50AA connected by 10AA and 50' to measure and provide inputs indicative of the battery and alternator voltage respectively; and temperature sensor 50AB, timer 50AC, and microprocessor 50AD which correspond respectively to elements 24AB, 24AC, and 24A of FIG. 1A to thus provide temperature and time inputs.

First Threshold

Figure 4A:
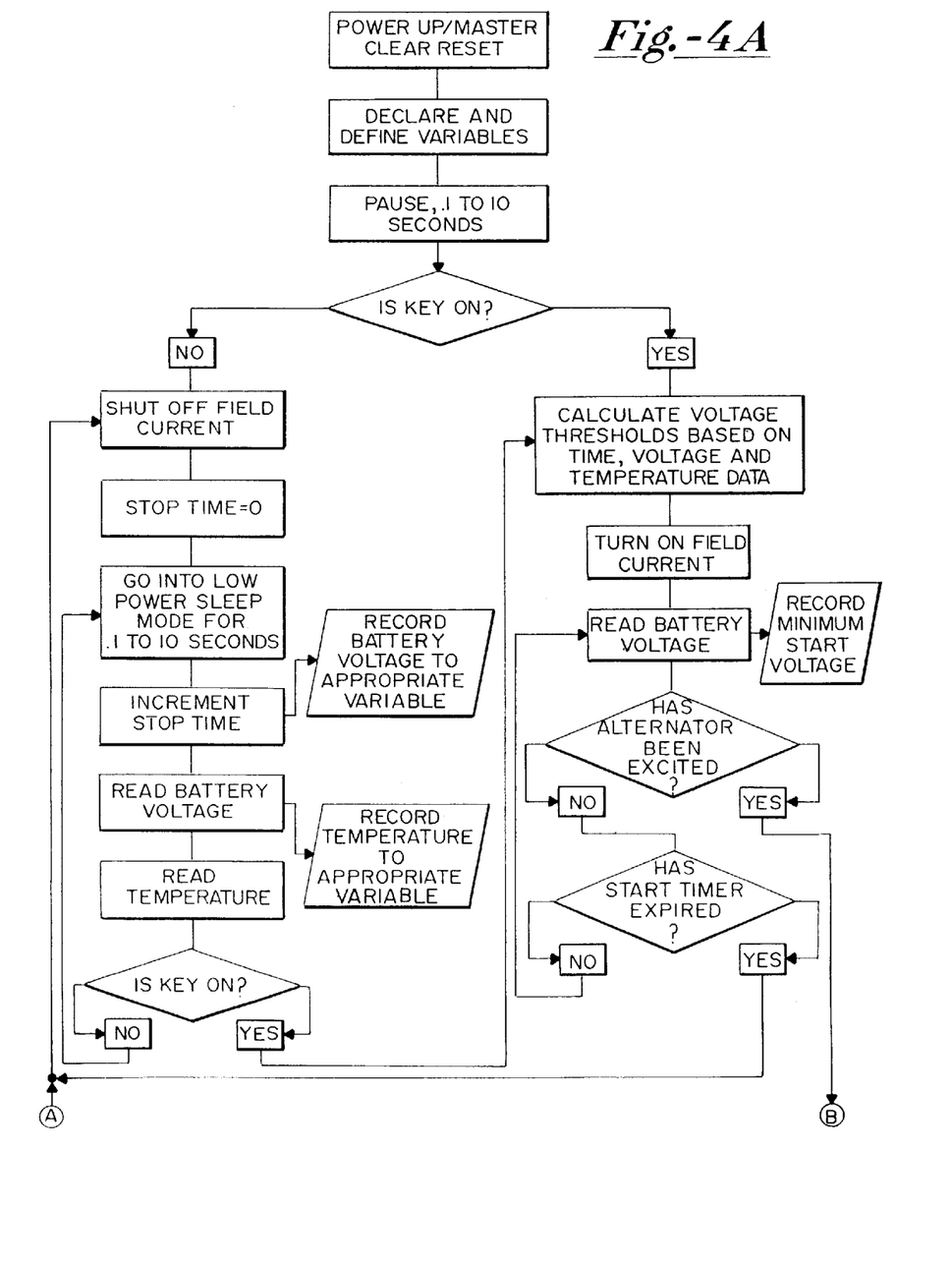
FIGS. 4A, 4B, 4C, 4D, 4E, and 4F collectively show an example algorithm or flowchart for the present invention and which works only with the invention internal to the regulator.
Figure 4B:
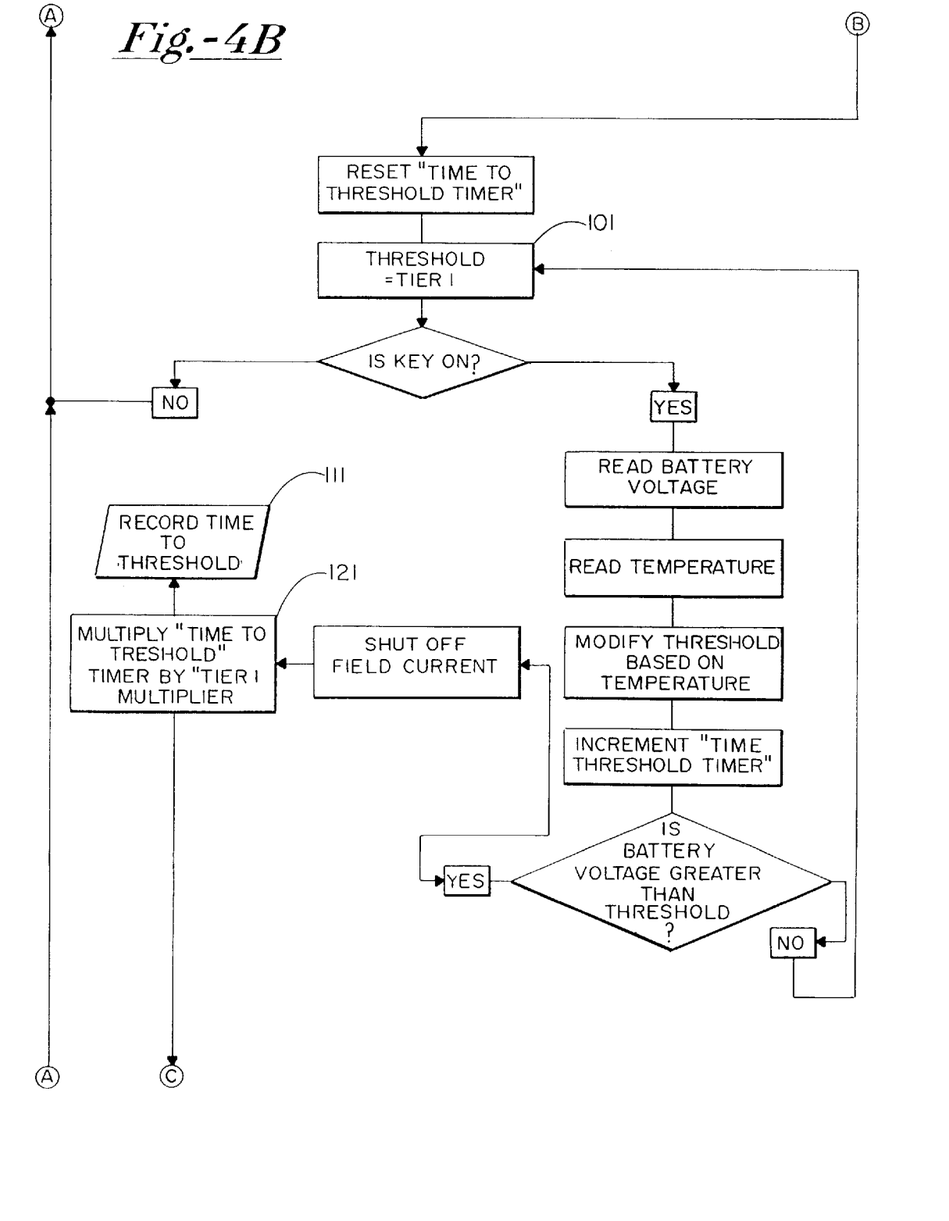
Figure 4C:
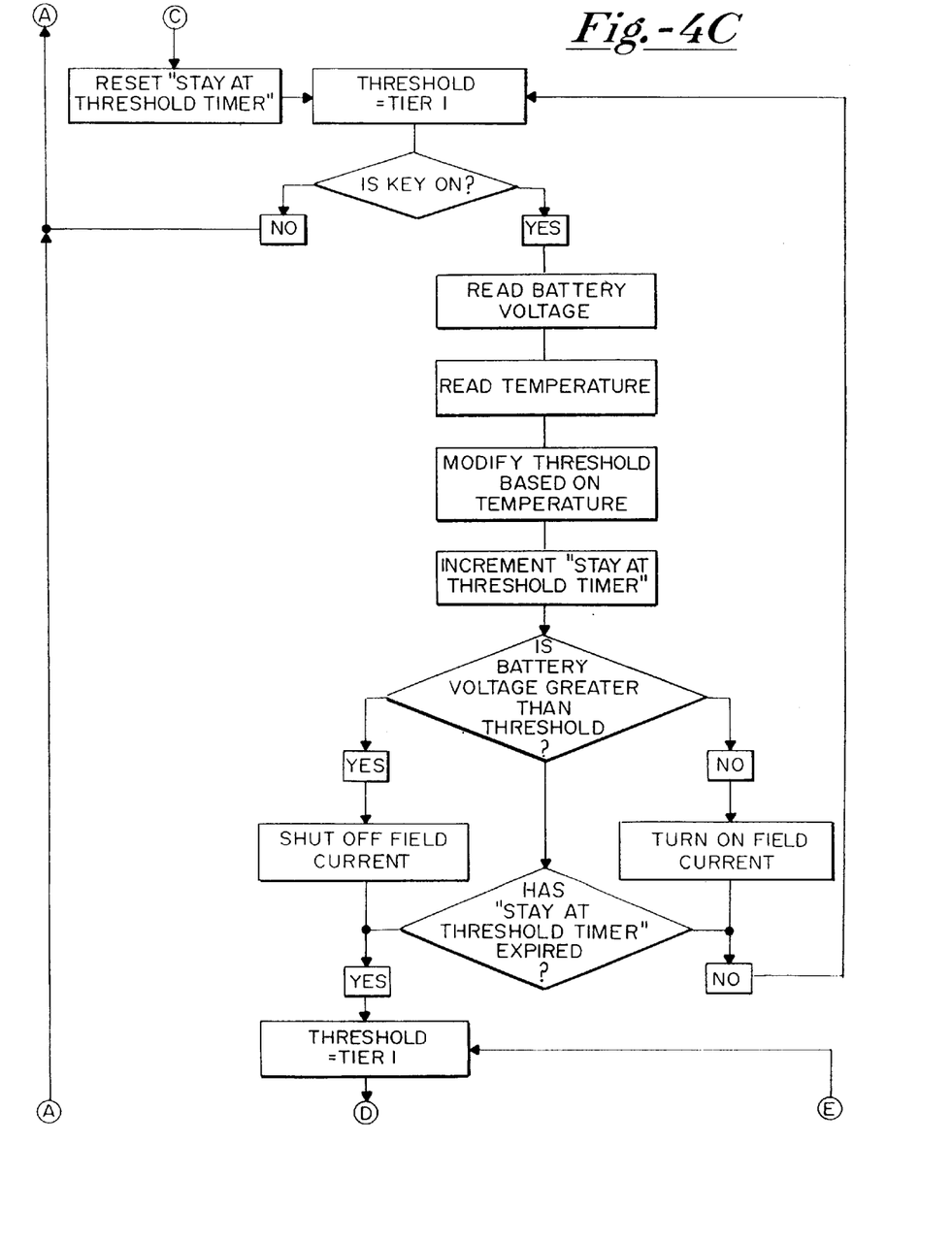
Figure 4D:
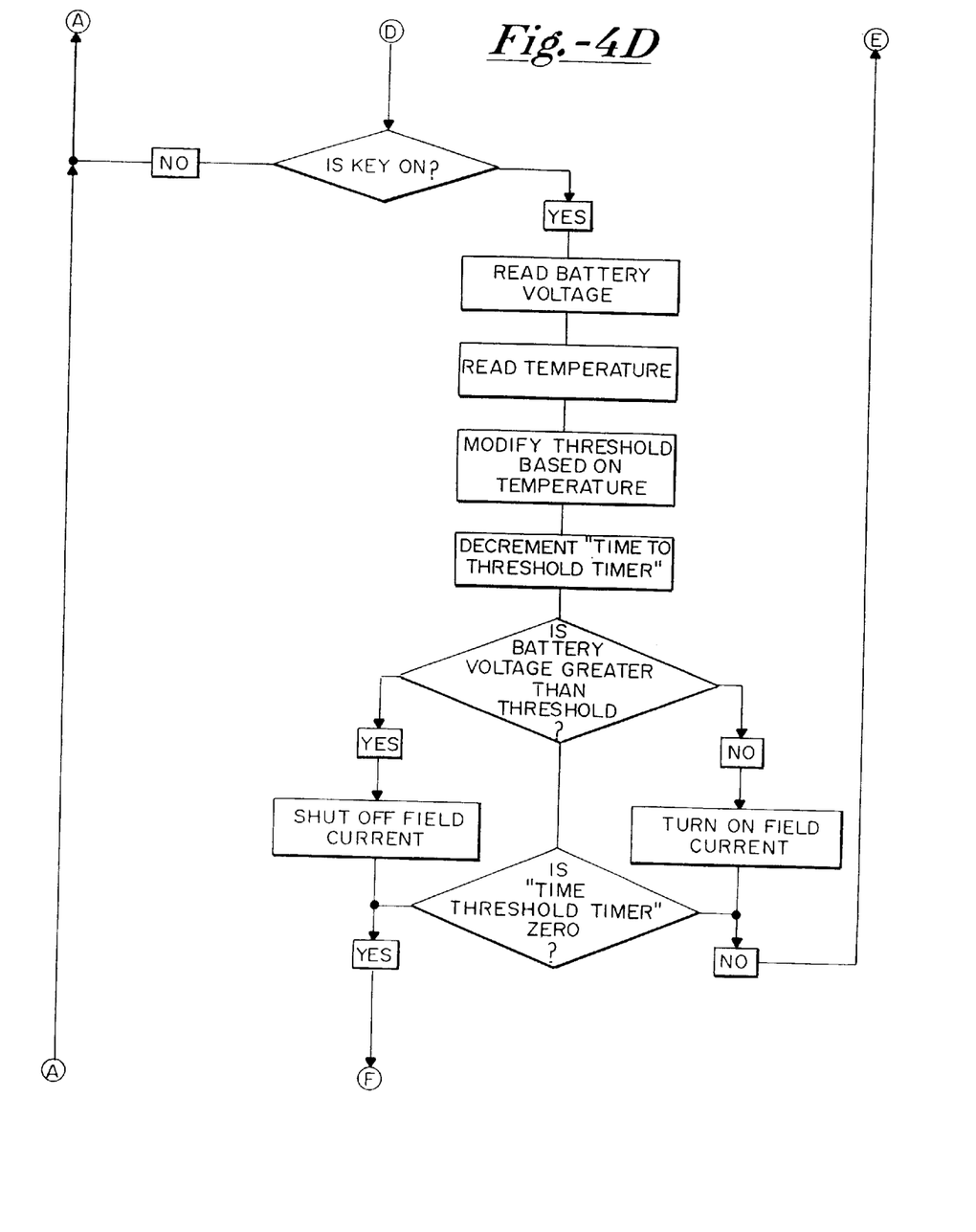
Figure 4E:
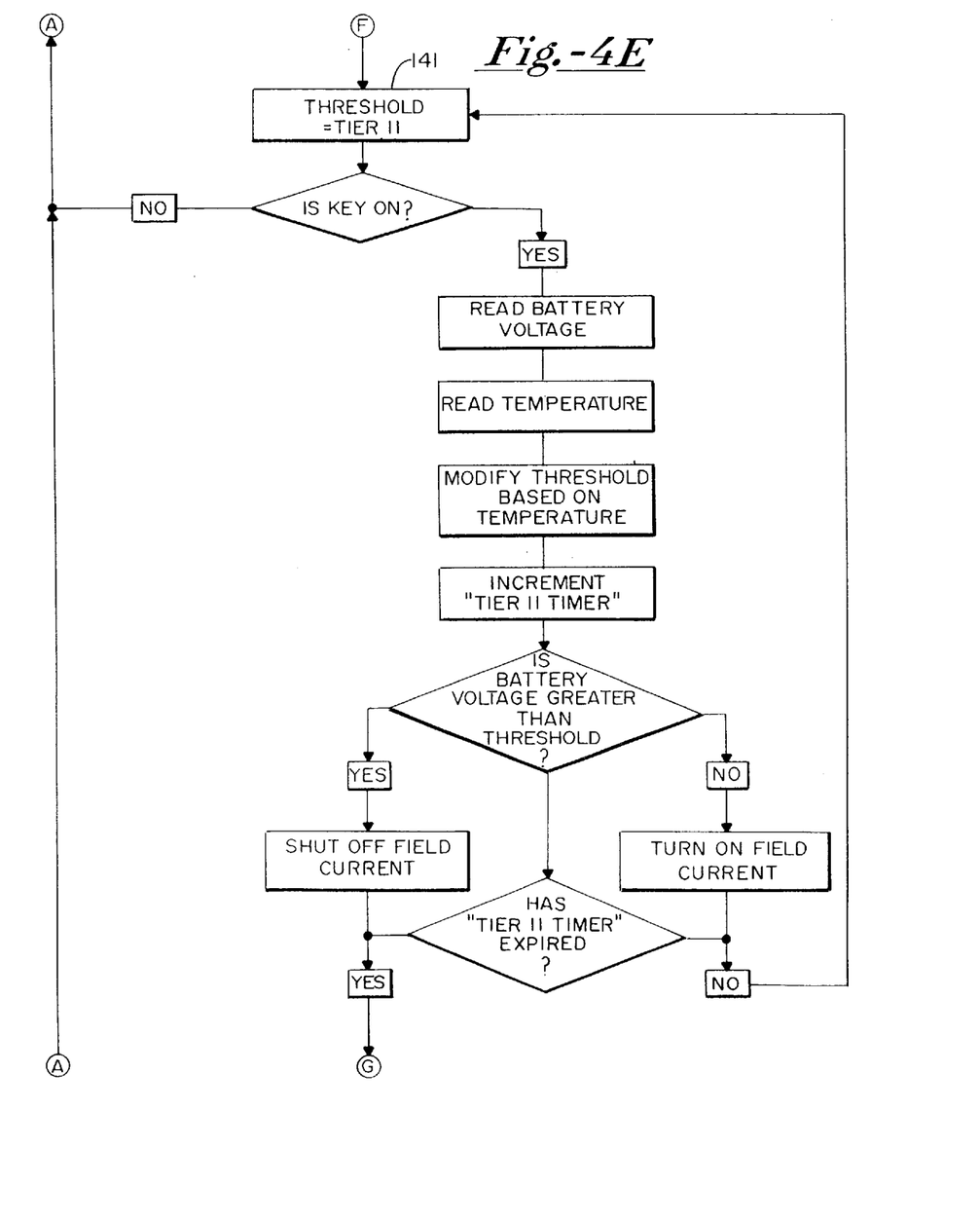

As indicated, the controller 24 (or 50 in FIG. 1B) monitors battery voltage, alternator voltage, regulator temperature and time. After the engine is started, the controller's job is to charge the battery back as fast as possible without damaging the battery or alternator. The smart regulator sets the first threshold (Tier I) for the battery between 15 and 16 volts. This is indicated in FIG. 4A by reference numeral 101. The apparatus then records how long it took for the battery to get to the Tier I threshold, this being designated by reference numeral 111 in FIG. 4B. This value (time) is used later to adjust the charging profile. Fully charged batteries take seconds to get to Tier I threshold, while discharged batteries take tens of minutes. In the voltage charging profile shown in FIG. 2, the designator BB represents the battery voltage reaching the Tier I threshold.

Referring again to FIGS. 4A and 4B (an example algorithm), the time to threshold measurement at 111 is multiplied at 121 by a Tier I multiplier. This has the effect on the alternator to maintain the battery voltage at the Tier I threshold for as long as it took to get there times an appropriate multiplier, or a Tier I multiplier; this multiplier may be around one (1) but may range from 0.1 to 10 depending upon applications and history of the charging system. This factor becomes more significant as Tier I time periods increase.

The smart regulator may keep the battery at the first or Tier I threshold for a short period of time (less than 60 seconds) regardless of how long it initially took to get there; this breaks up sulfation that has formed on the battery plates and replaces charge lost during starting. This is done for a short period of time so that overcharging does not occur.

Second Threshold

The smart regulator will regulate the battery's voltage to a second threshold (Tier II) when it is finished with the first. Tier II is the voltage range of normal voltage regulators (14–15 volts). The Tier II threshold is set by the software based on the immediate needs and past history of the battery. The smart regulator keeps the battery at Tier II to ensure that the battery is fully charged; the progression from Tier I threshold to Tier II threshold is depicted in the flowchart on FIG. 4E, resulting at the top of the FIG. 4E with box 141 designating a Tier II threshold.

Figure 4F:
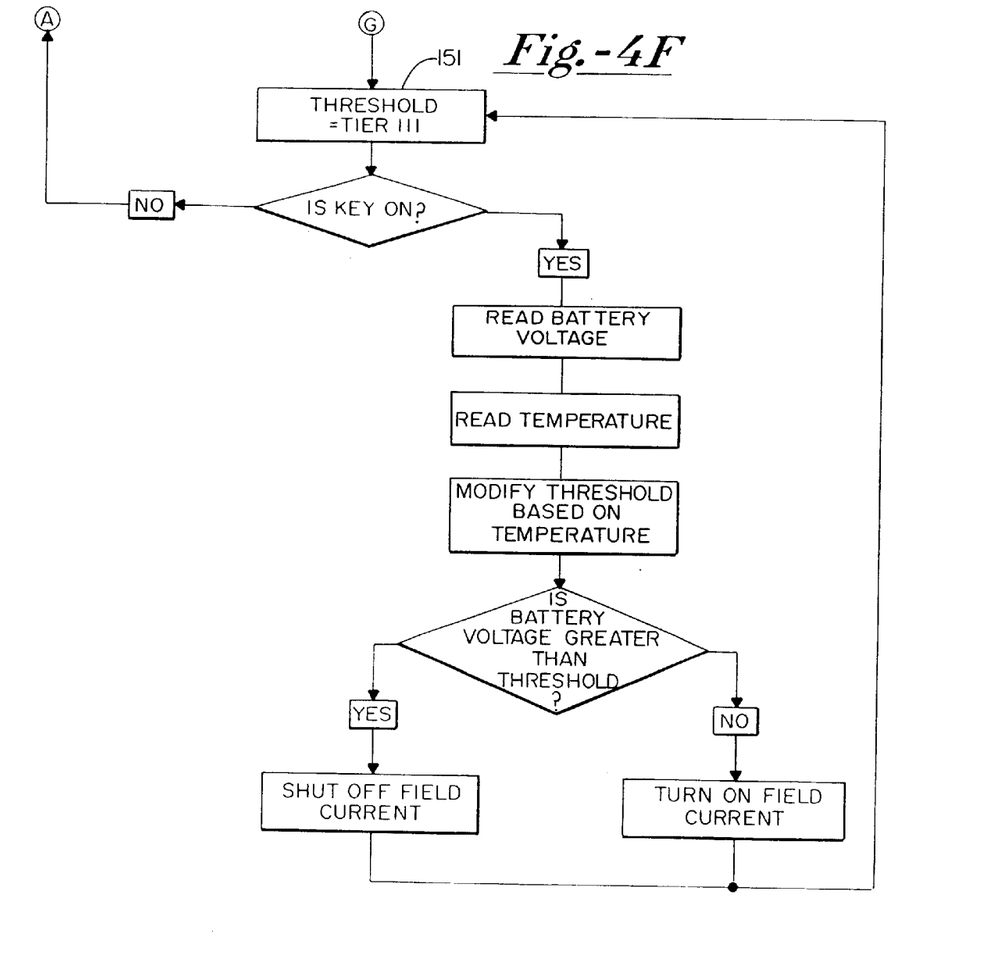

The smart regulator keeps the battery at Tier II to ensure that the battery is fully charged for a software determined length of time, following which the regulator then tapers back the battery's voltage to a Tier III threshold indicated by reference numeral 151 in FIG. 4F.

Figure 2:
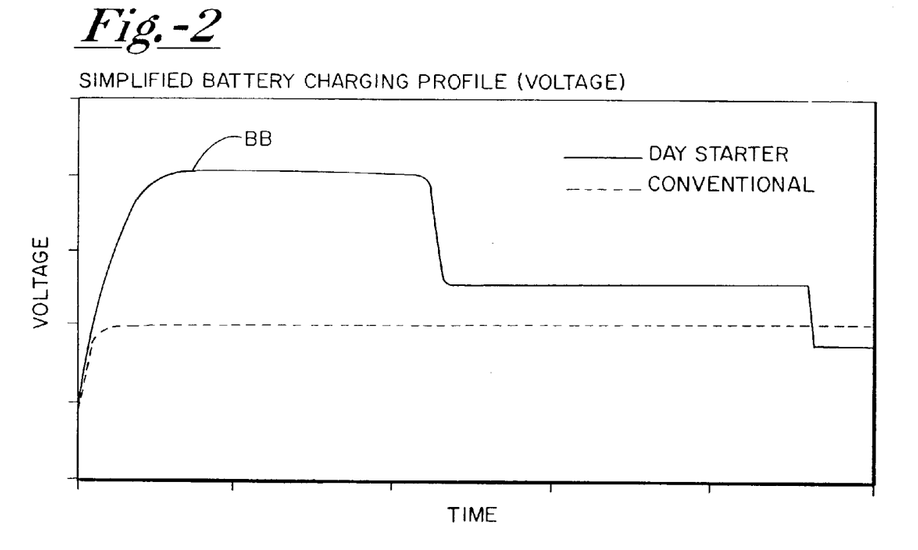
FIG. 2 is a simplified battery charging profile showing the voltage applied to the battery as a function of time, with the profile of the present invention being contrasted with conventional arrangements.
Figure 3:
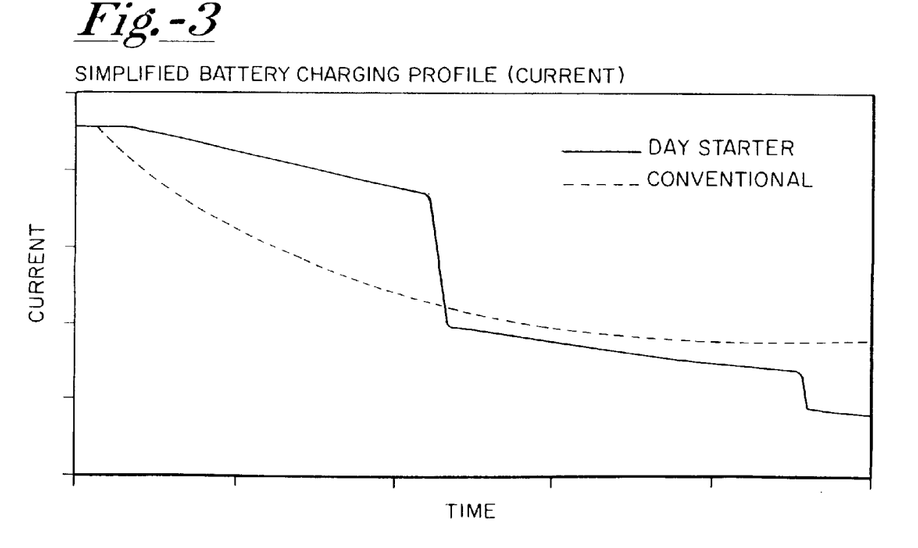
FIG. 3 is a simplified battery charging profile showing current delivered to the battery as a function of time, with the profile provided by the present invention being contrasted with that by conventional arrangements.

As indicated above, reference BB on the voltage profile shown in FIG. 2 is indicative of the Tier I threshold. After a passage of time, the voltage set point decreases to the Tier II threshold represented on FIG. 2 by the designator CC. Finally, the smart regulator causes the alternator voltage to decrease to the float level represented by DD in FIG. 2. It may be noted in FIG. 2 that the float voltage DD is somewhat less than the steady-state voltage from a conventional system. Likewise, FIG. 3 depicts the simplified battery current charging profile for the present invention as contrasted with a conventional apparatus. It will be seen that with the present invention, the charging current is maintained at a high level until the end of the Tier I threshold, following which the current drops significantly to a level below that of conventional apparatus.

Monitoring Alternator and Battery Current

Knowledge of battery state of charge is one of the present invention's goals. Therefore it is wise to monitor current into the battery. Measuring or calculating the voltage drop between the alternator and battery accomplishes this. This drop is proportional to the alternator current and wire resistance. The drop due to external loads can be measured by briefly dropping the system voltage to near the batteries instantaneous open circuit voltage. At which point the voltage drop from the alternator to battery is due to external loads only.

Voltage drop due to battery charge current can be calculated by subtracting the external load voltage drop from the total voltage drop. Battery charge current is still unknown because the wire resistance is unknown. Comparing previous voltage drops when the battery is fully charged solves this problem. The invention can now compare present battery charge current to the battery charge current of a fully charged battery. This information allows for a more precise determination of the battery's state of charge.

Significance of Temperature

Figure 5:
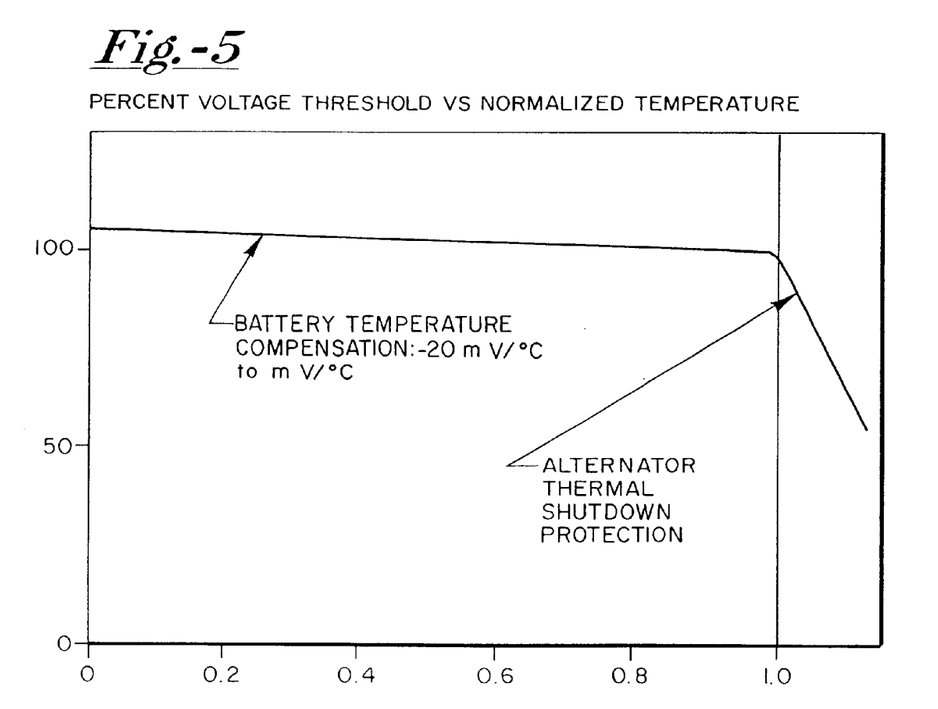
FIG. 5 shows a graph of percent voltage threshold versus temperature, in connection with alternator thermal shutdown protection.

Both the alternator and battery are affected by temperature. The smart regulator of the present invention monitors its own temperature to adjust the charge profile. It is important to protect the alternator because alternator diodes and windings fail at high temperatures. The present invention monitors its own temperature and extrapolates the alternator's diode and winding temperatures. Another concern is that a vehicle's battery may not be at a similar temperature as the voltage regulator because it is not near the alternator; in this case the battery's temperature is not well correlated to the regulator's temperature. Certain delivery trucks are a good example of this because the battery for same is under the step. For this reason, the controller provided by this invention must use ambient temperature as well as current regulator temperature to adjust the current charging profile. Ambient temperature is acquired by sensor 24AB recording regulator temperature before start if the vehicle has been off for an extended time of hours. The controller of the present invention protects the alternator because it has the ability to shut down the alternator when it reaches critical temperatures; this is depicted in FIG. 5.

It will be appreciated that battery temperature may be sensed either directly or indirectly. When sensed directly, a suitable probe is placed in contact with the battery structure per se, with indirect sensing being utilized in other cases where the immediate ambient temperature, through experience, may be utilized as a reasonably accurate reference.

Engine Off

When the engine stops running, the controller of the present invention still monitors voltage time and temperature. A surface charge remains on the battery plates immediately after the engine turns off, leaving a fully charged battery's open circuit voltage between 13 and 14 volts. This open circuit voltage is not a good indicator of state of charge. The controller of this invention may, however, monitor the discharge time constant of the battery's drift down to a normal open circuit voltage. This time constant depends on state of charge, parasitic load current and previous charge current.

Extended Stops

Extended stops also help the smart regulator to determine the battery's state of charge. The regulator adjusts the charge profile based on open circuit voltage. Batteries that have low open circuit voltages after extended stops are charged differently than batteries with normal open circuit voltages. It also adjusts the charge profile based on how long the engine has been off. This is beneficial to vehicles that are driven inconsistently, such as snowplows, tractors, third cars, and the like. Initial, high voltage charging of batteries that have sat for weeks or months helps breakup sulfation on the battery's plates. Accumulation of battery plate sulfation severely shortens the battery's life. The invention actively attacks it with every start.

Compilation of How Charging Profile is Adjusted

Figure 6:
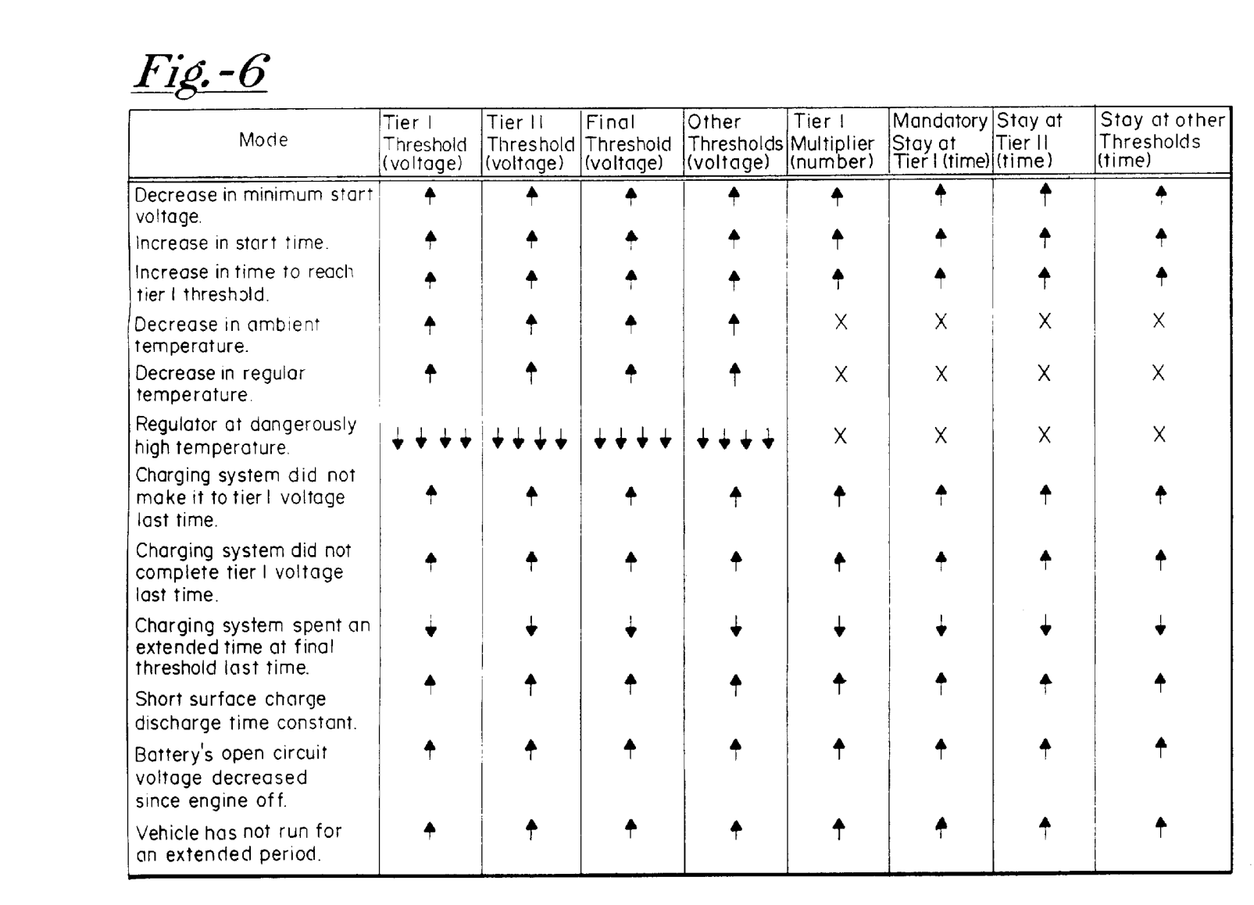
FIG. 6 is a table showing how different conditions from various modes of operation change the battery's charging profile.

FIG. 6 is a table, or compilation, of how the battery charging profile is adjusted with the table tabulating a number of situations, each of which affects charging profile. It will be understood that the controller provided by this invention may only use a few of the adjustments listed, or may use any of them.

Figure 7:
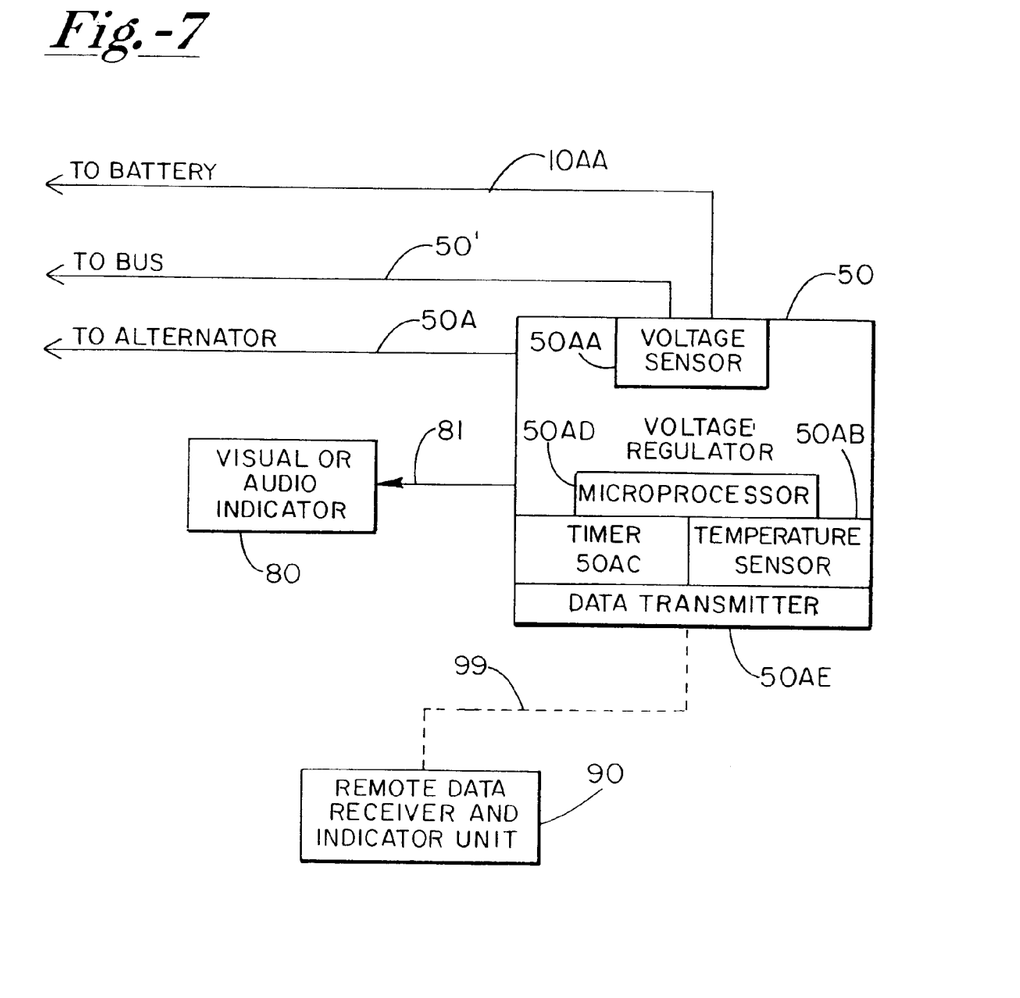
FIG. 7 is a partial block diagram of another embodiment of the invention wherein critical data concerning the battery may be transmitted to a remote (or local) receiving station.

FIG. 7 schematically shows other embodiments of the invention. The controller 50 is the same as that of FIG. 1B except it further includes (I) an output 81 connected to an indicator means 80, and (ii) a data transmitter 50AB connected by suitable 99 (such as serial wire, optical or infrared sensors, wireless, etc.) to a remote data receiver and indicator unit 90 which may be hand held.

The indicator 80 may be a light on the vehicle which may be flashed or operated in alternate patterns: a first to indicate that all battery charging parameters are normal, and a second directing the user to have the system checked before a serious problem occurs.

The data transmitter function 50AE of the controller of FIG. 7 transfers all (or selected ones) of the parameters recorded to the remote unit 90, which has appropriate software to analyze the data and to recommend the next step. This is invaluable in that it enables a centrally located technician to rapidly take inventory or census of the batteries in a plurality of vehicles. This is not only labor saving, but also identifies system problems before failure occurs; thus preventing road-calls and expensive downtime. In short, the present invention offers significant cost savings for users.

While the preferred embodiment of the invention has been illustrated, it will be understood that variations may be made by those skilled in the art without departing from the inventive concept. Accordingly, the invention is to be limited only by the scope of the following claims.

What is claimed is:

1. A battery recharging and maintenance system comprising:
   a. a battery connected for (i) supplying energy to electrical load apparatus and (ii) receiving recharging energy from an alternator;
   b. an alternator connected to drive means for producing electrical energy and connected to supply electrical energy to said electrical load apparatus and to said battery;
   c. voltage regulator means connected to said alternator and adapted to control said alternator so as to vary the magnitude of the voltage output of said alternator as a function of a control signal applied to said voltage regulator means;
   d. voltage regulator control means adapted to produce a control signal and being connected to control said voltage regulator means, said voltage regulator control means comprising means monitoring battery and alternator voltages, voltage regulator temperature, and time, said voltage regulator control means adjusting the charging profile for said battery as a function of the history of the parameters of battery and alternator voltages, voltage regulator temperature and time, said voltage regulator control means, after battery discharge, initially increasing the voltage of said alternator to a Tier I threshold, said Tier I threshold voltage being higher than the normal range of alternator voltage for maintaining a fully charged battery.

2. The system of claim 1 further characterized by said voltage regulator control means maintaining the voltage of said alternator at said Tier I threshold for a software determined time and then lowering the voltage of said alternator to a normal or Tier II threshold.

3. The system of claim 2 wherein said computed time is the sum of the time duration for said battery to reach said Tier I threshold and a supplemental time period determined at least in part by the said Tier I threshold duration.

4. The system of claim 3 wherein said supplemental time period is a preselected multiplier of the said Tier I threshold, and wherein said preselected multiplier is in the range from 0.1 to 10.

5. The system of claim 4 wherein said preselected multiplier is approximately 1.0.

6. The system of claim 2 wherein said alternator is controlled so that the voltage applied to said battery is at said Tier I threshold for a relatively short preselected time regardless of the length of time for said battery to reach said Tier I threshold.

7. The system of claim 6 wherein said relatively short preselected time is less than 60 seconds.

8. The system of claim 2 wherein said voltage regulator control means thereafter lowers the voltage applied to said battery to a final safe float voltage threshold (Tier III).

9. The system of claim 8 wherein said battery has a nominal rated voltage of 12 volts, said Tier I threshold is in the range of 15 to 16 volts, said Tier II threshold is in the range of 14 to 15 volts, and said final float voltage threshold is in the range of 13.5 to 14.2 volts.

10. The system of claim 1 further characterized by said voltage regulator control means producing a control signal as a function of the time elapsed between starts of said drive means.

11. The system of claim 1 wherein said voltage regulator control means produces a control signal as a function of minimum battery voltage and length of time of start of said drive means.

12. The system of claim 11 wherein said voltage regulator control means produces a control signal as a function of the integral of delta voltage versus the length of time of start of said drive means wherein delta voltage is the difference between normal battery voltage and the actual battery voltage during the start of said drive means.

13. A system of claim 1 wherein said voltage regulator control means includes indicator means for indicating normal and abnormal conditions of said battery.

14. The system of claim 1 wherein said voltage regulator control means includes data transmitting means for transmitting preselected battery charging parameters.

15. The system of claim 14 in combination with a remote data receiver, connected to receive said preselected battery charging parameters.

16. The system of claim 15 wherein said receiver includes indicator means.

* * * * *